US010082247B1

(12) United States Patent
Sinding (10) Patent No.: US 10,082,247 B1
(45) Date of Patent: Sep. 25, 2018

(54) METHOD OF REFUELING A HYDROGEN VEHICLE (71) Applicant: Nel Hydrogen A/S, Herning (DK)

(72) Inventor: Claus Due Sinding, Herning (DK)

(73) Assignee: NEL HYDROGEN A/S, Herning (DK)

( * ) Notice: Subject to any disclaimer, the term of this patent is extended or adjusted under 35 U.S.C. 154(b) by 12 days.

(21) Appl. No.: 15/724,745

(22) Filed: Oct. 4, 2017

(30) Foreign Application Priority Data

May 22, 2017 (DK) .................. 2017 70361

(51) Int. Cl.
F17C 5/06 (2006.01)
F17C 13/02 (2006.01)
F17C 13/04 (2006.01)

(52) U.S. Cl.
CPC .............. *F17C 5/06* (2013.01); *F17C 13/025* (2013.01); *F17C 13/026* (2013.01); *F17C 13/04* (2013.01); *F17C 2205/0326* (2013.01); *F17C 2221/012* (2013.01); *F17C 2223/036* (2013.01); *F17C 2250/043* (2013.01); *F17C 2250/0439* (2013.01); *F17C 2250/0636* (2013.01); *F17C 2250/075* (2013.01); *F17C 2265/065* (2013.01); *F17C 2270/0139* (2013.01); *F17C 2270/0168* (2013.01)

(58) Field of Classification Search
CPC ........ F17C 5/06; F17C 13/025; F17C 13/026; F17C 13/04; F17C 2205/0326; F17C 2221/012; F17C 2250/043; F17C 2250/0439; F17C 2250/0636; F17C 2250/075

USPC ............................................................ 141/4
See application file for complete search history.

(56) References Cited

U.S. PATENT DOCUMENTS

| 2005/0178463 | A1* | 8/2005 | Kountz | ..................... F17C 9/02 |
| | | | | 141/4 |
| 2007/0257043 | A1* | 11/2007 | Kanoya | ..................... F17C 5/06 |
| | | | | 220/581 |
| 2010/0307636 | A1 | 12/2010 | Uemura | |
| 2013/0197777 | A1* | 8/2013 | Sloan | ..................... G01F 23/18 |
| | | | | 701/102 |

(Continued)

FOREIGN PATENT DOCUMENTS

| EP | 1336795 A2 | 8/2003 |
| WO | 2014150320 A1 | 9/2014 |
| WO | 2014200959 A2 | 12/2014 |

*Primary Examiner* — Timothy L Maust
*Assistant Examiner* — Andrew Stclair
(74) *Attorney, Agent, or Firm* — Cantor Colbur LLP (57) ABSTRACT A method of refueling a tank of a vehicle with a hydrogen gas from a hydrogen refueling station, including initiating flow of hydrogen gas in a hose being controlled by a controller controlling a valve, opening the valve and monitoring the temperature and pressure of the hydrogen gas in tank, based on the monitored temperature and the monitored pressure establishing an estimated state of charge during the refueling, terminating the refueling when the estimated state of charge reaches an upper state of charge being above the tank rated density, the upper state of charge being determined on the basis of a pre-estimated correction of state of charge, the pre-estimated correction of state of charge designating a decrease of the estimated state of charge in the vehicle tank after the closing of the valve disconnecting the hose between the vehicle tank and the hydrogen source.

16 Claims, 8 Drawing Sheets (56) References Cited

U.S. PATENT DOCUMENTS

| | | | |
|---|---|---|---|
| 2013/0202988 A1* | 8/2013 | Wang | H01M 8/04201 429/513 |
| 2014/0202584 A1* | 7/2014 | Mathison | F17C 5/007 141/4 |
| 2014/0290790 A1* | 10/2014 | Mathison | F17C 5/06 141/4 |
| 2015/0377416 A1* | 12/2015 | Miyoshi | F17C 5/06 141/95 |
| 2017/0130901 A1* | 5/2017 | Sloan | F17C 5/06 |

* cited by examiner

METHOD OF REFUELING A HYDROGEN VEHICLE

CROSS REFERENCE TO RELATED APPLICATION

This application is related to and claims the benefit of Danish Patent Application Number PA 2017 70361 filed on May 22, 2017, the contents of which are incorporated herein by reference in their entirety.

TECHNICAL FIELD

The present invention relates to a method of refueling a hydrogen vehicle.

BACKGROUND

Refueling of a hydrogen vehicle is basically concerned with how the refueling can be performed safely and without over-fueling the vehicle tank.

One method is described in SAE J2601 directing how a refueling can be safely executed without the risk of over-fueling the vehicle tank.

Various prior art methods may be attempted adapted to comply with the above-mentioned standard. One such method is described in EP1336795. Here an electric controller has knowledge of the rated density of a full vehicle tank, knowledge which is obtained from the manufacture of the tank. The electric controller is then periodically during the refueling, based on temperature and pressure signals from inside the tank, calculating the density in the receiving tank. When the calculated density is less than the tank rated density a flow is allowed to the tank and when the calculated density is higher than the tank rated density the flow is discontinued. When the density in the tank is equal to or higher than the rated density, the electric controller is waiting for the instrument to settle and if the density is still above rated density the refueling is complete. If not, the refueling is again resumed, thereby establishing a refueling of a number of refueling cycles. In this way over time, the effective stop criterion is a calculated density equaling the tank rated density.

A challenge in relation to this and other known refueling methods are that they may be relatively inefficient considering both the filling procedure and the resulting degree of refueling. It is in particular noted that consumers may find the known methods to deviate too much from refueling methods already known to the users when applying conventional fuel, such as gasoline.

BRIEF SUMMARY

It is therefore an object of the present invention to provide a method of refueling a vehicle tank providing a relatively fast and predictable time of refueling which is as close to 100% state of charge as possible within the frame of the SAE J2601 refueling standard. Not only for the pressure categories mentioned in the SAE J2601 refueling standard, the present invention is advantageous in that it allows to refuel a fleet of vehicles with tank of different pressure categories.

The method relates to a method of refueling of a tank of a vehicle with a hydrogen gas from a hydrogen refueling station, wherein the refueling includes: connecting a hydrogen source with the vehicle tank by means of a hose, the flow of hydrogen gas in the hose being controlled by a controller controlling a valve, initiating the refueling by determining the pressure of the vehicle tank, opening the valve and monitoring the temperature and pressure of the hydrogen gas in vehicle tank, based on the monitored temperature and the monitored pressure establishing an estimated state of charge SOC during the refueling, a state of charge of 100% related to the vehicle tank being referred to as a tank rated density, terminating the refueling of the vehicle tank by closing of the valve when the estimated state of charge reaches an upper state of charge, the upper state of charge being above the tank rated density, the upper state of charge being determined on the basis of a pre-estimated correction of state of charge, the pre-estimated correction of state of charge designating a decrease of the estimated state of charge in the vehicle tank after the closing of the valve, disconnecting the hose between the vehicle tank and the hydrogen source.

The monitored temperature in the tank may typically be measured by a sensor located in the vehicle and inside the vehicle tank or coupled to the vehicle tank as far as the measured temperature are sufficient to established the estimated state of charge.

The monitored pressure in the tank may typically be measured by a sensor located in the vehicle and inside the vehicle tank or coupled to the vehicle tank. Due to the nature of hydrogen, the pressure inside the vehicle tank may also be measured at the refueling station, i.e. externally to the vehicle and the vehicle tank. In other words, a monitoring of the pressure (and temperature) inside the vehicle tank does not necessarily require the that monitoring is performed in the tank, but rather that a measure is obtained suitable for estimating the state of charge.

According to an embodiment of the invention, it is thus possible to obtain both an acceptable state of charge combined with an efficient and fast refueling process. The use of the pre-estimated correction of state of charge relies in the assumption that the measured and subsequently estimated state of charge during the refueling process does not sufficiently reflect the actual amount of hydrogen injected into the vehicle tank. The use of the correction estimate is advantageous partly due to the fact that it has been shown that the correction may be pre-estimated and thereby used with very little use of real-time signal processing during the refueling process but also because the refueling time may be significantly reduced compared to existing refueling methods.

It is also noted that the refueling method, while using the pre-estimated correction of state of charge, may in fact result in a higher amount of hydrogen in the vehicle tank, i.e. true state of charge, after a refueling as the somewhat misleading state of charge estimated on the basis of measurements reflecting the pressure of the hydrogen in the vehicle and the temperature in the vehicle tank would tend to terminate the refueling process too early.

According to an aspect of the invention it is therefore possible to estimate the true amount of hydrogen in the vehicle without requirement of lengthy refueling processes during which pressure and temperature has to be measured throughout the process.

An important advantage of determining the termination of the refueling is that it is determined on a rising edge of state of charge estimates in the sense that it is determined at a time where the estimated state of charge is rising. The use of a pre-estimated state of charge correction makes it easier to apply a sensible stop criterion for the refueling considering measuring uncertainties resulting in apparent pressure and/or temperature drops occurring if temperature and/or pressure measurements are measured are misread at the vehicle.

According to the present method it will thus be relatively easy to compensate or ignore pressure drops, as the present refueling method in practice only needs to consider the rising curve but may ignore the more complicated pressure drops at the falling edge of a refueling process where both measuring and estimation of state of charge has been terminated anyway.

A pre-estimated correction of state of charge may be both an absolute value pre-estimated on the basis of e.g. calculations or simulations, but the per-estimated value may also be based on empirical knowledge obtained through real-life test on relevant equipment.

The pre-estimated correction may also vary from refueling to refueling depending on the involved system and the setup. The refueling station may thus comprise a number of pre-estimated corrections of state of charge depending on the vehicle tank. In other words, the values may be pre-estimated but a selection of the currently applied correction factor may be performed e.g. in information received at the refueling station about the vehicle tank.

It should be noted that the estimated state of charge may differ from the true state of charge and that this difference may relate to the conditions under which the measurement of temperature and pressure in the vehicle tank is made. The pre-estimated correction should thus preferable reflect an attempt to estimate the true state of charge as precise as possible.

The pre-estimated corrections of state of charge may also be affected by factors at the refueling station, such as currently applied hydrogen pressure, temperature at the site, temperature measured at the refueling station and/or at the vehicle tank, etc.

According to an embodiment of the invention, the decrease of the estimated state of charge in the vehicle tank after the closing of the valve takes place at least partly after the closing of the valve and after the hose has been disconnected.

According to an embodiment of the invention, tank data related to the tank of the vehicle is communicated from the vehicle comprising the tank through a data communication line between the vehicle and the hydrogen refueling station.

According to an embodiment of the invention, tank data related to the tank of the vehicle is communicated from the vehicle comprising the tank through an initial automatic data communication communicating vehicle tank type identification data between the vehicle and the hydrogen refueling station and wherein the upper state of charge is determined on the basis of vehicle tank type identification data.

According to an embodiment of the invention, the pre-estimated correction of state of charge when subtracted from the upper state of charge will estimate a state of charge approximating the tank rated density after the valve has been closed.

By using of the pre-estimated correction of state of charge to determine the upper state of charge at which the valve should be closed, it will now be possible to reach the tank rated density more efficiently as a final closing of the valve may now be performed prior to settling of pressure and temperature in the tank.

It should be noted that the closing of the valve may involve latency due to system design. It may thus take a little time from detection of current state of charge until the controller establishes that a closing should occur. The closing as such may also involve latency, both with respect to latency related to the control signal but, in particular, in relation to the mechanical closing of the valve.

It is therefore also noted that valve type and the method by means of which the valve is closed may indeed be considered when pre-estimating the upper state of charge. The effective time duration from when the valve is starting to close until the valve is completely closed may thus be considered when establishing the pre-estimated correction of state of charge.

According to an embodiment of the invention, the pre-estimated correction of state of charge when subtracted from the upper state of charge will estimate a state of charge of the tank which is below the tank rated density.

According to an embodiment of the invention, the pre-estimated correction of state of charge when subtracted from the upper state of charge will estimate a state of charge of the tank, which is above the tank rated density.

According to an embodiment of the invention, the pre-estimated correction of state of charge when subtracted from the upper state of charge will estimate a state of charge of the tank which is within +/−2% of the tank rated density.

According to an embodiment of the invention, the pre-estimated correction of state of charge when subtracted from the upper state of charge will estimate a state of charge of the tank which result in a stabilization of the vehicle tank after closing of the valve which is 0.1 to 5% below the tank rated density.

According to an embodiment of the invention, the time between the closing of the valve and the time at which the estimated state of charge has reached the final state of charge is referred to as settling time and wherein the settling time is between 5-120 seconds.

According to an embodiment of the invention, the disconnecting of the hose between the vehicle tank and the hydrogen source is initiated before the estimated state of charge has reached the final state of charge.

According to an embodiment of the invention, the disconnecting of the hose between the vehicle tank and the hydrogen source is initiated before the estimated state of charge has reached a final state of charge which is greater than the tank rated density.

According to an embodiment of the invention, the upper state of charge is calculated and pre-stored in memory associated with the controller.

The upper state of charge may e.g. be calculated on the basis of knowledge about the filling method and the vehicle tank.

Different upper state of charge may thus be relevant for different types of tanks, and these may be calculated and stored in memory associated with the memory of the hydrogen refueling station controller basically to enable a feasible refueling process which is stopped at a suitable upper state of charge. It should be noted that stabilization in embodiments of the invention may occur when measurements of temperature and pressure within the vehicle tank are no longer available.

According to an embodiment of the invention, the monitored temperature and the monitored pressure is obtained through measuring by means of sensors thereby obtaining temperature representative data and pressure representative data, the temperature representative data and pressure representative data being communicated to the controller by means of a data connection between the vehicle and the hydrogen refueling station during the refueling process.

According to an embodiment of the invention, the communication of the temperature representative data and pressure representative data to the controller by means of the data connection between the vehicle and the hydrogen refueling station during the refueling process is terminated when the hydrogen flow line is disconnected at the end of the fueling process.

According to an embodiment of the invention, pressure of hydrogen flowing in the hose is measured at the hydrogen refueling station and converted into hydrogen refueling station pressure representative data.

According to an embodiment of the invention, the refueling process upon an undesired termination of the data connection between the vehicle and the hydrogen refueling station is continued with a stop criterion for the refueling now being a predefined hydrogen refueling station pressure instead of the upper state of charge.

According to an advantageous embodiment of the invention it is now possible to apply a robust and safe refueling procedure, which may be continued even after estimation of state of charge becomes difficult due to lack of temperature indicative data and pressure indicative data measured in the vehicle.

According to an embodiment of the invention, the valve is closed within seconds from when the estimated state of charge has reached the tank rated density.

According to an embodiment of the invention, the valve is at least partly open for a period of time from when the estimated state of charge has reached the tank rated density.

The period of time in which the valve is at least partly open before closing starts may, after the estimated state of charge has been reached, e.g. be between 0.1 to 5 seconds.

The period of time before closing of the valve starts may after the estimated state of charge has been reached e.g. be between 0.1 to 5 seconds.

BRIEF DESCRIPTION OF THE FIGURES

In the following, a few exemplary embodiments of the invention are described with reference to the figures, of which

DETAILED DESCRIPTION

Figure 1:
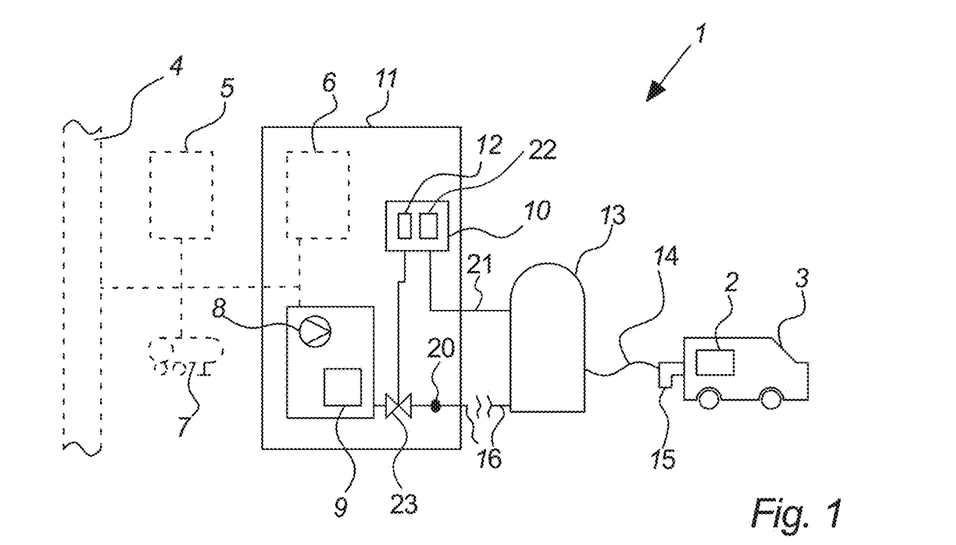
FIG. 1 illustrates a hydrogen refueling station fluidly connected to a vehicle.

FIG. 1 illustrates a schematic view of a hydrogen refueling station (HRS; Hydrogen Refueling Station) 1 according to an embodiment of invention. The HRS 1 supplies hydrogen to a receiving tank 2 of a vehicle 3 from a hydrogen supply in the form of a supply network 4, external hydrogen storage 5, internal hydrogen storage 6 and/or a temporary hydrogen storage 7.

To regulate the hydrogen pressure, temperature, flow, time etc. to comply with currents standards such as e.g. the SAE J2601 standard for refueling of a vehicle 3 with hydrogen, the HRS 1 comprises a compressor 8, a cooling system 9 and a control and monitoring system 10 all which are preferably located within the enclosure 11 of the HRS 1 or the dispenser 13.

A refueling process involves several states, one of which may be moving from a "standby state" to a "pre-refueling/refueling start state" upon activation of a the controller 12 e.g. when a refueling is requested by a user. Such request is typically initiated by the user, who is directly or indirectly activating a controller 12. Activation of the controller 12 may be established when the user lifts the nozzle 15 for attaching it to the vehicle 3, interacting with a user interface of the HRS or the like.

At most locations of HRS 1 it is preferred to physically separate the HRS enclosure 11 from a dispenser 13 which is connectable to the vehicle 3 by means of a hose 14 and a nozzle 15 (hydrogen outlet). In such embodiment, the HRS enclosure 11 and the dispenser 13 is connected by one or more supply lines 16 for supplying hydrogen from the HRS 1 via the dispenser 13 to the receiving tank 2 of the vehicle 3. To ease understanding, a reference to the hydrogen storage 6 is a reference to any hydrogen storages such as e.g. 4, 5, 6, 7 and a reference to hose 14 is a reference to the supply line between hydrogen storage 6 and vehicle tank 2 including supply line 16 and hose 14.

Even though the HRS 1 illustrated on FIG. 1 is illustrated to comprise enclosure 11 and dispenser 13 separated and connected with a supply line 16 it should be mentioned that the components of the HRS 1 from hydrogen supply 4, 5, 6, 7 to the hydrogen outlet which in FIG. 1 is illustrate as a nozzle 15 and everything (valves, transducers, actuators, i.e. all components used for controlling the hydrogen flow) in the hydrogen flow path between may be integrated completely in one enclosure or as illustrated in FIG. 1 installed as one or more individual components.

The illustrated principal components of the control and monitoring system 10 comprises a controller 12, a data memory 22 communicatively coupled to the controller 12, a valve 23 controlled by the controller and a pressure sensor 20. The control and monitoring system 10 may of course include other hardware components, the hardware topology or memory and controller may vary depending design choices of the communication between the principal components and may be adapted to comply with the intended purpose.

Especially, it is worth mentioning that the station controller (e.g. an industrial programmable logic controller PLC) besides its temporary and primary memory may communicate to an external memory. In this way data acquired or used (e.g. for calculation and results hereof) during operation of the hydrogen refueling station can be stored at the external memory where it is e.g. used for backup, further analysis, etc.

Based on analysis of historic data from operation of the refueling station a correction factor can be determined, the use of which in the refueling process will be described below. Typically, a correction factor determined based on historic data is a "worst-case" correction factor i.e. applying a conservative correction of the termination of the refueling process to ensure standard defined limits are complied with.

The correction factor can be optimized i.e. increasing the limits (e.g. in terms of continue the refueling a time period from observing 100% SOC or continuing a percentage above 100% SOC) terminating the refueling process if (preferably) real-time data (e.g. pressure and temperature of gas in the vehicle tank, type of vehicle/tank, etc.) received from the vehicle is considered.

The memory associated to the controller may be managed in different suitable ways. One approach may be to use the memory associated to the controller for all the controlling of the refueling station and then make readings of the memory at certain intervals and communicating these memory readings to a central system controlling a plurality of refueling stations. In case of a breakdown of the controller, the data loss may be reduced to e.g. less than the applied interval.

The refueling process described in this document is used for filling a storage tank 2, such as that of a hydrogen powered vehicle 3, with hydrogen fuel, preferably in its gaseous state. The refueling process is executed by the hydrogen refueling station 1. The refueling process is performed according to regulations provided by the SAE J2601 standard. This standard specifies the density for two major pressure categories at 100% state of charge (SOC; State Of Charge) i.e. when according to SAE J2601, the receiving tank 2 is full. Accordingly, the density for a full receiving tank of a 350 bar refueling is a density of 24.0 g/L and for a 700 bar refueling is a density of 40.2 g/L. This is also in this document referred to as 100% SOC or tank rated density (TRD).

The present invention describes a refueling process implementing a tank filling process suitable for refueling vehicle tanks 2 of any pressure category. Based on measured temperature and pressure of gas in the tank 2 and the pressure category of the tank 2, an estimated SOC also referred to simply as SOC can be calculated for the refueling. The estimated state of charge/state of charge is in FIGS. 4-7 denoted SOC.

In a preferred embodiment of the invention, to ensure as high density of gas in the tank 2 as possible after terminating the refueling process, the refueling process is allow to continue until an estimated SOC i.e. the SOC established during the refueling based on measured temperature and pressure exceed the standard defined 100% SOC. This can be allowed because, when a pressure sensor is exposed to a flow gas, the measurements hereof is higher than its measurements made when it is not exposed to a flow of gas. Since the measurements from the pressure sensor during the refueling process (i.e. when exposed to a flow of gas) is used to calculate the estimated SOC, this estimated SOC will decrease during a settling time after terminating the refueling process to what in the document is referred to as final SOC. The present invention exploits this knowledge to continue the refueling to the estimated SOC is above the 100% SOC knowing that after a settling time it will drop to a final SOC. The level of the final SOC is preferably close to the 100% SOC but can be both higher or lower. It should be noted that the term final in relation to SOC may refer to a final condition reflecting the intended SOC when the refueling has been terminated and the hydrogen has settled in the tank. It is of course possible that the so-called final SOC may drop somewhat even after termination of the refueling either because of the already mentioned settling but also simply because consumption of the hydrogen has started when the car start moving again after having been refueled.

Obviously, the SOC (amount of hydrogen) in the tank 2 do not drop or fall but remains constant. What happens that seems to change the SOC during the settling time is that the measurements of the pressure and temperature sensors become more true to the actual temperature and pressure in the tank 2. When there is a flow of gas and pressure change, this influences the measurements of the sensors. Hence, after the flow is terminated and the gas in the tank has settled at a given pressure the actual pressure and temperature can be measured and the final SOC can be established. This knowledge should be remembered when a reference in this document is made to a fall or drop in SOC. Hence, no hydrogen is "disappearing" from the tank, the SOC only change due to settling of the pressure and temperature sensors.

Figure 2:
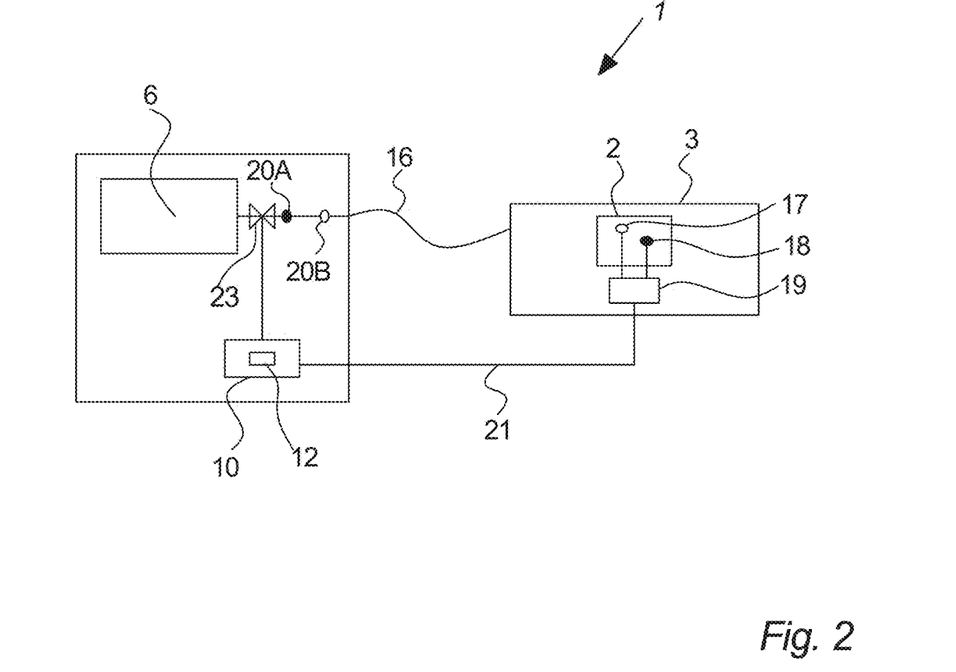
FIG. 2 illustrates communication between a vehicle and the hydrogen refueling station.

FIG. 2 illustrates a vehicle 3 having a tank 2. The vehicle tank pressure is measured by a pressure sensor 17 and the vehicle tank temperature is measured by a temperature sensor 18. At FIG. 2 the sensors 17, 18 are illustrated to communicate with the controller 12 via a vehicle controller 19. However, the sensors 17, 18 may communicate directly with the controller 12.

FIG. 2 also illustrates station pressure sensors 20. According to an embodiment of the invention, there are two station pressure sensors 20A, 20B located to measure pressure at substantially the same point in the hydrogen supply line 16. The redundancy in the stations pressure sensors obtained by having two sensors are advantageous. The location of the pressure sensors 20 are preferably as close to the nozzle 15 as possible i.e. inside the center module 11 of the HRS/dispenser 13 as close to the point where a flexible hose 14 is connected hereto. If no pressure measurements are received from the vehicle, the controller 12 are using the station pressure sensors 20 to determine the pressure of the vehicle tank 2. No matter how the SOC is determined, the flow of gas to the vehicle tank 23 is controlled i.e. initiated and terminated (and here between) via one or more valves represented by valve 23. It should be mentioned that from the controller 12 sends closing instructions to the valve 23 until the flow of hydrogen is stopped, typically 1 second has passed. The period of 1 second has been found from analyses of historic refueling data.

It should also be noted that the term valve may effectively refer to an arrangement of valves together functioning as a valve within the scope of the invention.

Also on FIG. 2 the communication between vehicle 3 and HRS 1 is illustrated as a wired communication channel 21, however any kind of suitable wireless data communication can be used for this communication.

All known refueling processes of a vehicle tank 2 are typically stopped at the latest when the SOC reaches 100% SOC. The estimated SOC is established as the ratio of compressed hydrogen storage system (CHSS; Compressed Hydrogen Storage System) hydrogen density (calculated density in the tank 2 during refueling) to the density at nominal working pressure (NWP; Nominal Working Pressure) rated at the standard temperature of 15° C. (normalized density at 15° C., for a pressure category of 700 bar the normalized density is 40.2 g/L) is expressed as a percentage and is computed based on the gas density per equation 1 according to SAE J2601.

$$SOC(\%) = \frac{\rho(P, T)}{\rho(NWP, 15° C.)} \times 100 \qquad [EQ1]$$

The pressure category is either established by mechanical means, by visual recognition, communicated from the vehicle controller 19 or the like, hence even though not illustrated or described the pressure category needs to be determined. The reason why this step is not described is that the HRS and vehicle mechanically is designed to fit and thereby only one pressure category may exist. Example of mechanical means/design for determine pressure category includes a match between nozzle and vehicle receptacle i.e. if nozzle matches receptacle, the controller 12 knows that the vehicle tank is e.g. 700 bar. If the vehicle is configured for communicating and the HRS is configured for receiving this information, then communication of this information is preferably a step of the refueling procedure.

According to an advantageous embodiment of the invention there is a desire to perform a refueling of which the final SOC in the tank 2 is as close to 100% SOC as possible after the settling time has elapsed.

The difference between the estimated SOC based on which the refueling is terminated and the final SOC after a settling time has passed is referred to as a so-called correction state of charge (CSOC). The correction state of charge can be pre-estimated and can therefore be part of the stop criterion terminating the refueling. Hence, a stop criterion ensuring a final SOC of at least 100% SOC can be established as an upper state of charge (USOC) which is 100% SOC+ the pre-estimated correction state of charge.

Further, the settling time during which the estimated SOC drops to end at the final SOC can also be pre-estimated (i.e. a time for settling can be estimated) or pre-determined (i.e. a fixe time can be determined). The latter could be said to be optimized towards a given time for the refueling and the former towards 100% SOC.

One effect of the pre-estimated correction state of charge is that the refueling can be terminated without waiting for the settling time to elapse. Compared to prior art this is advantages in that the final SOC is then higher than known refueling processes stopping at 100% SOC and faster than known refueling processes waiting for the settling time to elapse after first having reached 100% SOC, then making new SOC calculations and if needed to reach 100% SOC initiate another refueling cycle. The present invention is further advantageous over the latter in that by pre-estimating the correction state of charge to determine the upper state of charge, there is no need for receiving measurements from the vehicle after the upper state of charge has been reached. Thereby, the vehicle can leave the refueling station after the upper state of charge including the pre-estimated correction state of charge is reached.

The refueling is started when the controller 12 is activated in one way or the other. Typically, the activation is made when a person (a user) is to refuel a vehicle and interacts with a payment module, info screen or removes the nozzle 15 from the nozzle holder. Also, wireless technology can be used to activate the controller 12 and when activated, the refueling process starts.

The refueling process includes initiating flow of hydrogen from hydrogen storage to vehicle tank 2 in compliance with SAE J2601. Accordingly, the controller 12 controls an average ramp rate of flow of hydrogen which is kept within temperature and pressure limits.

Figure 3:
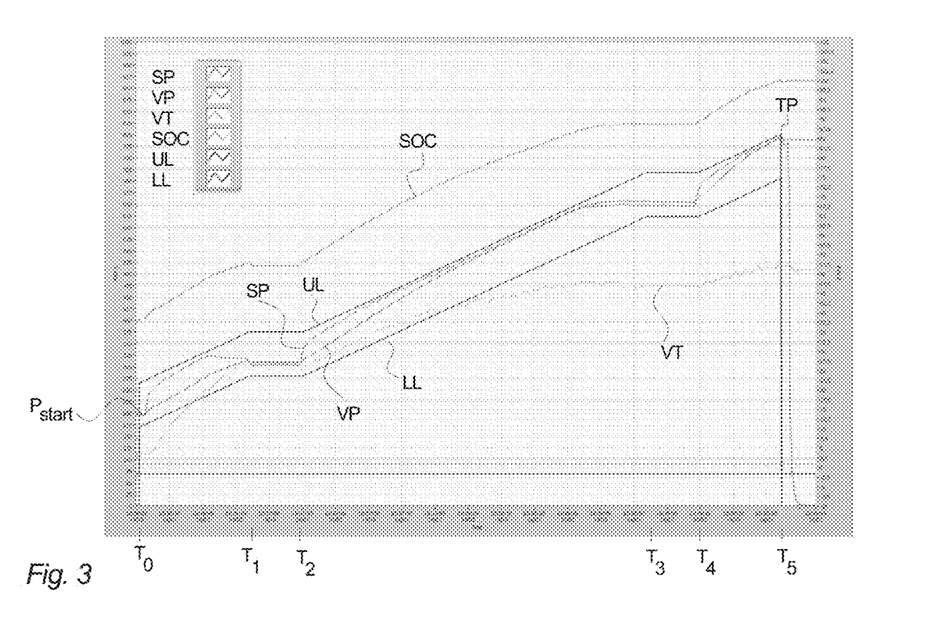
FIG. 3 illustrates a part of a refueling method.

An example of a refueling is illustrated at FIG. 3. Here the corridor within which the pressure of the gas in the tank 2 has to be maintained is illustrated. The corridor may e.g. be defined by SAE J 2601 for some pressure categories. The corridor has an upper limit UL and a lower limit LL. Within this corridor the station pressure SP measured by sensor 20 is illustrated with the vehicle tank pressure VP measured by the sensor 18. The difference is mainly due to pressure drop over the supply line 16 and hose 14 and the flow herein.

During the refueling, the temperature of gas in the vehicle tank VT is measured (preferably by the temperature sensor 18) and provided to the controller 12.

The SOC calculation (also referred to as establishing) cannot be more precise than the measurements of pressure and temperature obtained from the vehicle. Pressure and temperature measurements provided by vehicle sensors 17, 18 are very hard to verify. Therefore, in relation to pressure, the HRS includes pressure sensors 20 which can be used to verify the received pressure form the vehicle. Hence if the station pressure sensor 20 measures the same as the vehicle pressure sensor 17 e.g. within a given tolerance/compensation added to account for the flow at the position of the sensors 20 and pressure drop to the vehicle, the received pressure measurement is considered valid and can be used.

It is possible to reduce flow and thereby obtain more reliable pressure measurements, however this will extend the time for the refueling which is not always desired Returning to FIG. 3, the refueling starts at a pressure Pstart at time T0. Between time T0 and T1 the pressure and thereby the flow of gas is increased. Between T1 and T2 (and between T3 and T4), a so-called bank shift is made, during these period the pressure rise is minimal if existing at all and thereby, the flow of gas is very limited if existing at all. Between T2 and T3 the pressure ramp increase towards the upper limit UL to reduce the time for refueling. At time T5 the target pressure TP is reached and the refueling is terminated.

The illustrated state of charge SOC can be calculated from EQ1 based on measured vehicle temperature VT and pressure VP. At time T5 based on hereon, the SOC is calculated to be 100% and the refueling is terminated.

The pressure ramp is controlled to be within the corridor by one or more valves represented by valve 23 preferably located upstream the pressure sensor 20. The valve 23 is preferably controlled based on measurements of vehicle pressure VP and or station pressure SP.

Figure 4A:
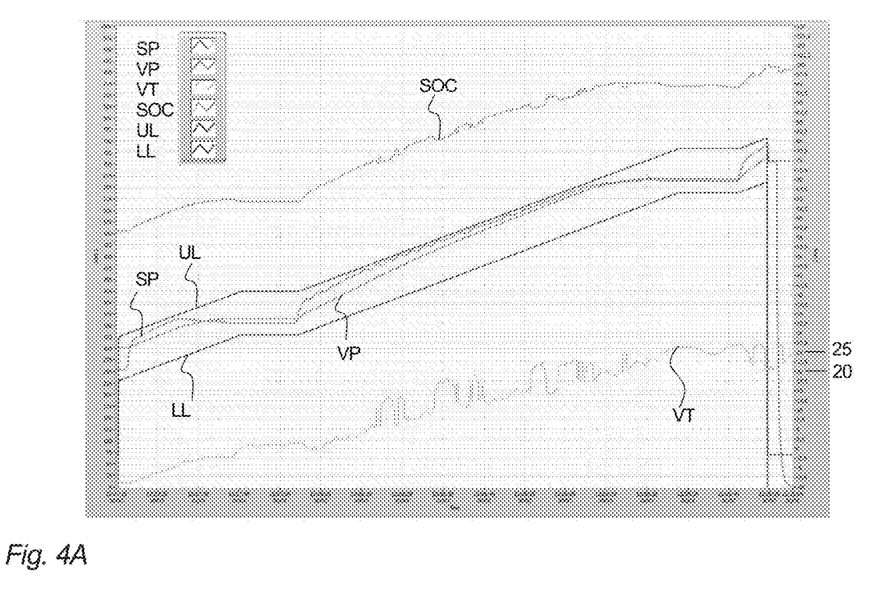
FIG. 4A, 4B illustrates another example of a refueling method.
Figure 4B:
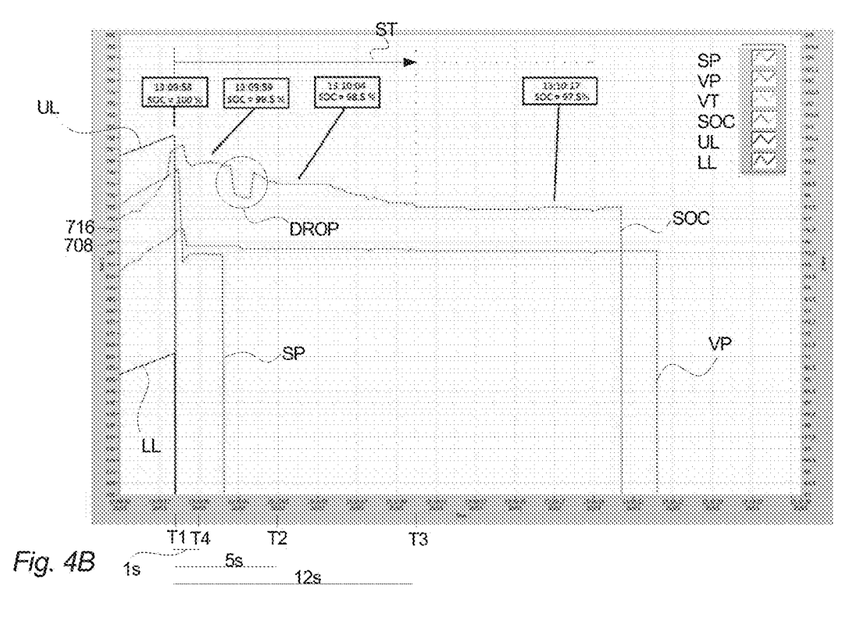

FIGS. 4A and 4B illustrates another example of a refueling, where FIG. 4A shows the period until closing of the valve and FIG. 4B is showing a time period after the valve of the refueling station is or has been closed. At FIG. 4A it is observed that fluctuations in the vehicle temperature VT measurements is reflected in the SOC calculations. Preferably a refueling according to some of the embodiments of the present invention should be in compliance with SAE J2601 standard.

FIG. 4B illustrates a zoom of the termination of the refueling illustrated at FIG. 4A. 100% SOC is observed at time T1. Within the next 5 seconds, it is noted that the SOC has dropped to 98.5% at T2. Further it is noted that the SOC keeps falling until approximately 12 seconds has passed since 100% SOC was observed to a SOC at 97.5% at T3. Accordingly FIG. 4B illustrates a settling time ST of a duration of between 10 and 15 seconds during which the SOC drops from 100% to 97.5%. Accordingly, the correction state of charge is in this example 2.5%.

What happens is that at time T1, 100% SOC is calculated by the controller 12 based on a vehicle pressure VP of 716 bar and a vehicle temperature VT of 21° C. (see FIG. 4A). At time T1, the controller 12 signals to the valve 23 to close. As can be seen the pressure continues to rise less than half a second from the closing command from the controller 12 i.e. the valve 23 is closed less than half a second from controller 12 sends the closing signal.

1 second after stop signal is send to the valve 23 at T4, SOC has dropped to 99.5% due to a vehicle pressure VP drop down to 708 bar. The pressure drop of 8 bar may occur in that now no active flow is influencing the pressure sensor 18 in the vehicle tank 2.

5 seconds after stop signal is send to the valve 23 at T2, SOC has dropped to 98.5% due to increase of vehicle temperature VT from 21° C. to 24° C. (see FIG. 4A), the pressure is stabilized at 707 bar.

12-20 seconds after stop signal is send to the valve 23, SOC is stabilized at 97.5% due to stabilization of vehicle pressure VP at 707 bar and vehicle temperature VT at 28° C. (not illustrated).

Accordingly, the settling time ST depends on the time it takes for the pressure and temperature of the tank 2 to stabilize and in the example of FIG. 4B, the settling time is approximately 12 seconds at T3.

From FIGS. 4A and 4B taking the configuration used in the illustrated refueling as a generic configuration, it can be seen that during the settling time of 12 seconds a pressure drop of 9 bar and temperature increase of 7° C. can be expected.

Of course these numbers and the settling time ST may vary from refueling to refueling. The determining factors for the settling time ST among others are ambient temperature vs vehicle tank temperature VT, vehicle tank geometry, vehicle tank material, pressure/temperature sensor sensitivity to flow, etc. Accordingly, to be able to calculate the settling time and final pressure/temperature approximations have to be made. Below are examples of the relevant calculation of 1) SOC increase from signal is sent to close valve until the valve is closed (between T1 and T4 of FIG. 4B),
2) SOC suddenly drop in seconds after valve is closed (also between T1 and T4 of FIG. 4B) and
3) SOC slowly drops over the settling time (between T1 and T3).

It should be mentioned, that the "drop" in SOC between T4 and T2 is caused by fluctuations in temperature measurements of the sensor 18.

The SOC increase until closing of valve 23 (see EQ5) can in approximated calculations be explained as follows:

$$SOC = \frac{\text{density }(\rho)}{\text{Reference density }(\rho 0)} = \frac{\frac{\text{mass }(m)}{\text{volume }(V0)}}{\text{Reference density }(\rho 0)} \quad [EQ2]$$

Where: Density ρ [rho] is the density (mass to volume) of hydrogen in the vehicle tank
Reference density ρ0 [rho0] of full filling [Kg/m³], (Prated, T0) where Prated is tank rated pressure [bar] and T0 is reference temperature [° C.] (at which Prated is determined)
m is the mass of hydrogen transferred and stored in the vehicle tank [Kg] (can be measured e.g. from measuring flow to the vehicle tank (calculated based on measurements from a flow sensor) or alternatively calculated based on knowledge of starting pressure and temperature and measured pressure and temperature during the refueling and volume of the vehicle tank)
V0 is vehicle tank size [L]

$$m = \int_0^{Tclose} \frac{m'(t)}{dt} + m0 \quad [EQ3]$$

Where: first part of EQ3 is the additional mass transferred during the time it takes for the valve 23 to close, and
m0 is a constant based on the stop criterion: V0*ρs [rhos] where ρs [rhos] is density of stop criterion [Kg/m³]
m' is assumed a linear decrease from initial gas flow at stop of the filing i.e. when the signal to close the valve 23 is to be sent to the valve see EQ4

$$m'(t) = m'\,init * \frac{tclose - t}{tclose} \quad [EQ4]$$

Where: m' init is initial mass flow at the time the signal to close valve 23 is sent to the valve
Tclose is time to close valve from the time the signal is sent to the valve is closed.

$$SOC(t) = \frac{\frac{m'\,init * \left(\frac{tclose - t}{tclose}\right) + V0 * \rho s}{V0}}{\rho 0(Prated, T0)} \quad [EQ5]$$

The SOC drops right after closing of the valve and thereby stopping the flow. In particular, if the flow was high and the valve is closed immediately a drop of SOC is seen. This pressure drop is assumed invert proportional to tclose. Hence the pressure drop ΔP is approximated in EQ6.

$$\Delta P \propto 10 - tclose \quad [EQ6]$$

EQ6 is a linear approximation between two extremes the first of which an abrupt closure of the vale which will lead to a sudden drop in pressure and the second is a slow (here 10 seconds) close time for the valve which will not lead to a pressure drop from the closing of the valve.

The change of SOC (correction state of charge) during the settling time occurs due to a slightly creep of pressure and temperature in the vehicle tank 2. It has turned out that the pressure and temperature of the vehicle tank has settled within 30 seconds from terminating the flow/refueling (also referred to as filling). During these 30 seconds the pressure Vp has a tendency to decrease and the temperature Vt to increase. Again, assuming linearity this creep in pressure and temperature can be calculated as follows:

$$Pfinal = Pstop - Pcreep * \frac{t}{tset} \quad [EQ7]$$

$$Tfinal = Tstop + Tcreep * \frac{t}{tset} \quad [EQ8]$$

Where: Pfinal is the pressure in the vehicle tank after settling time has expired
Pstop is the pressure measured in the vehicle tank when signal to close valve is to be sent to the valve
Pcreep is the pressure drop measured during the settling time
Tfinal is the temperature in the vehicle tank after settling time has expired
Tstop is the temperature measured in the vehicle tank when signal to close valve is to be sent to the valve
Tcreep is the temperature increase measured during the settling time
t is the passed since the close signal was sent to the valve
tset is the determined settling time typically less than 30 seconds, can be determined based on field data.

Here it should be noted that the estimated state of charge when signal is sent to close the valve 23 is calculated by using Tstop and Pstop in EQ1 or EQ2.

Accordingly, the final SOC is influenced by the creep of pressure and temperature during the settling time and can be determined as follows:

$$SOCfinal = \frac{\rho(Pfinal, Tfinal)}{\rho 0} \quad [EQ9]$$

Where: ρ [rho] is determined from the final pressure Pfinal and final temperature Tfinal.

ρ0 [Rho0] is the reference density

From the above considerations of SOC in relation to termination of a refueling, it is clear that stopping the refueling exactly when the estimated SOC is reaching 100% SOC for the first time will lead to a vehicle tank having a final SOC below 100% after a settling time has lapsed.

According to the present invention, the refueling is therefore not terminated until the estimated SOC is above 100% SOC. Hence, the above is taken into account to ensure a final SOC as close to 100% SOC in the vehicle tank after settling has passed and without applying repetition cycles. Therefore, according to an embodiment of the invention, the refueling is not terminated before the estimated SOC is above 100%. In the example illustrated in FIG. 4, the pressure drop of 9 bar and temperature increase of 7° C. would be equivalent to terminating the refueling at an upper state of charge of 102-103% SOC i.e. with a correction state of charge of 2-3% added to the 100% SOC.

According to the present invention to achieve this, either the refueling can be allowed to continue a given time after 100% SOC has been observed for the first time or until a given percentage above 100% SOC has been reached.

Figure 5:
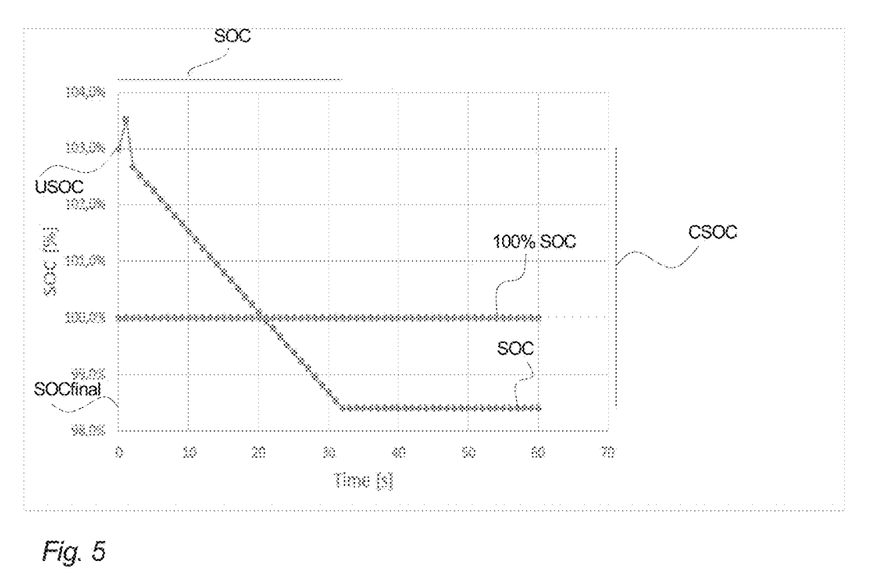
FIG. 5, 6 illustrates a pressure ramp of a refueling process terminated at a percentage above 100% SOC.

FIG. 5 illustrates a simulation of a refueling which is terminated when the estimated SOC reaches an upper state of charge USOC of 103% (in table 1 referred to as target SOC). As can be seen, the settling time is just above 30 seconds and during period the SOC drops from 103% to between 99% and 98% i.e. a correction state of charge CSOC of more than 4%.

The peak in SOC shortly after closing the valve 23 at the upper state of charge of 103% can be explained by the above equations EQ5 and EQ6 whereas the final SOC can be explained by the above EQ9.

The simulation of the result of which is illustrated in FIG. 5 is made based on the data of table 1.

TABLE 1

Stop at 103% SOC with 1 second valve closing

| | | Recommended values |
|---|---|---|
| Variables - Closing valve | | |
| Vehicle Tank Volume | 144 liter | Current vehicles (122 L-144 L) |
| Vehicle Tank Rating | 700 bar | Current ratings (350 bar and 700 bar) |
| Valve closing time | 1 seconds | Requirement: 0-10 seconds |
| Target SOC | 103 % | |
| Initial flow at stop | 30 g/s | Observed 0 g/s-30 g/s |
| Variables - Creep | | |
| Pressure drop @ stop | 9 bar | AUTO: Depending on valve closing |
| Pressure creep | 20 bar | Observed 0 bar-20 bar |
| Temperature creep | 10 ° C. | Observed 0° C.-10° C. |

Figure 6:
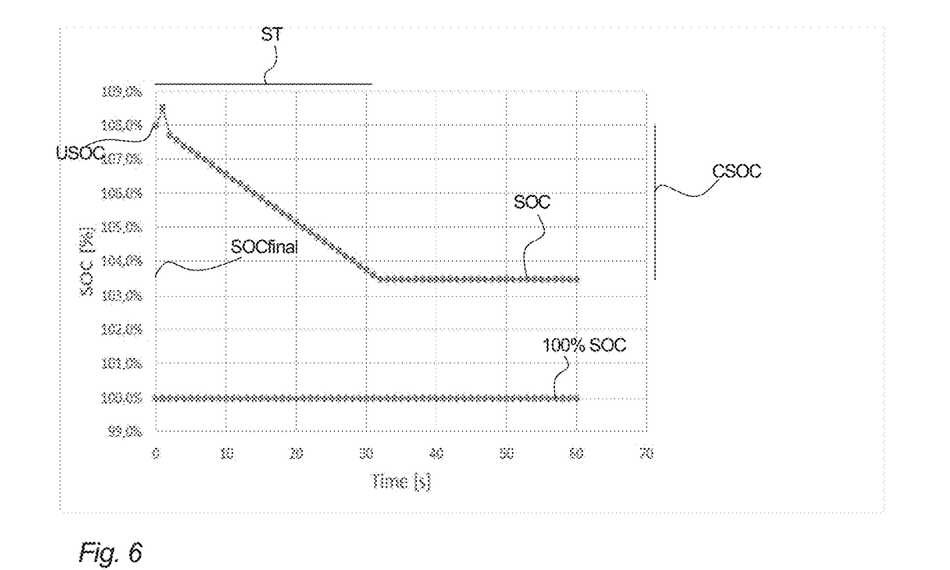

FIG. 6 illustrates a simulation of a refueling similar to the one illustrated in FIG. 5. Only difference is that the upper state of charge USOC in this example is 108% (in the table referred to as target SOC). The date of the simulation resulting in the plot of FIG. 6 is found in table 2.

TABLE 2

Stop at 108% SOC with 1 second valve closing

| | | Recommended values |
|---|---|---|
| Variables - Closing valve | | |
| Vehicle Tank Volume | 144 liter | Current vehicles (122 L-144 L) |
| Vehicle Tank Rating | 700 bar | Current ratings (350 bar and 700 bar) |
| Valve closing time | 1 seconds | Requirement: 0-10 seconds |
| Target SOC | 108 % | |
| Initial flow at stop | 30 g/s | Observed 0 g/s-30 g/s |
| Variables - Creep | | |
| Pressure drop @ stop | 9 bar | AUTO: Depending on valve closing |
| Pressure creep | 20 bar | Observed 0 bar-20 bar |
| Temperature creep | 10 ° C. | Observed 0° C.-10° C. |

As can be noted the drop from upper state of charge USOC to the final SOC i.e. the correction state of charge CSOC is the same in the plots of FIGS. 5 and 6. Hence, based on data of table 1 or 2 a refueling has to be terminated when the estimated state of charge is just above 4% higher than the desired final SOC. This means if it is important that the final SOC does not exceed 100% SOC, the refueling has to be terminated when the estimated state of charge reaches an upper state of charge USOC of 104% SOC.

As can be seen from FIGS. 5 and 6 after the settling time ST, the estimated state of charge SOC equals the final SOC—i.e. the true SOC in the vehicle tank. Another approach to terminate the refueling, still within the scope of the present invention, is to wait a few seconds from 100% SOC is observed until closing the valve 23 and thereby terminating the refueling.

Figure 7:
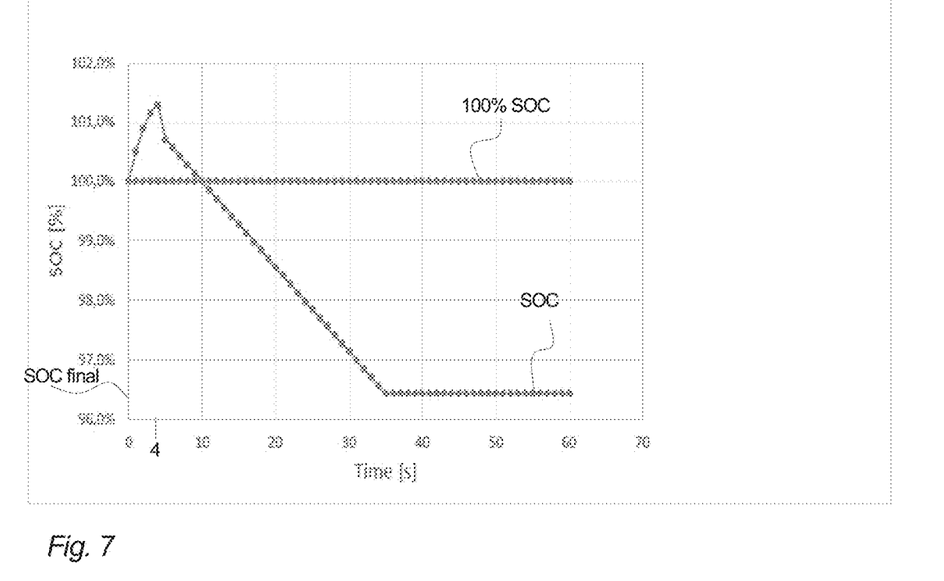
FIG. 7, 8 illustrates a pressure ramp of a refueling process terminated at a given time after 100% have been observed.
Figure 8:
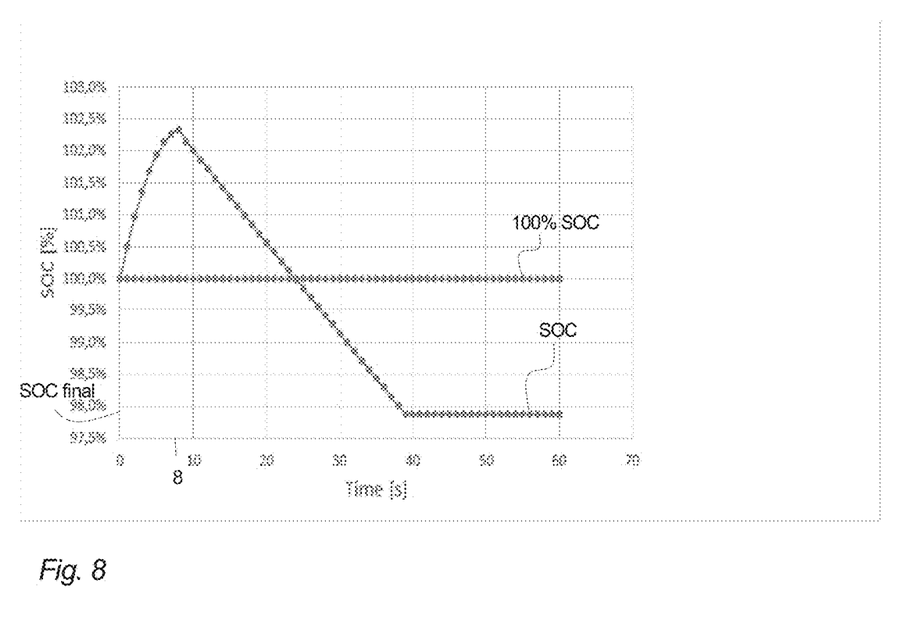

FIG. 7 illustrates a plot of a simulation where the valve is closed 4 seconds after 100% SOC is observed. Close signal send from controller to valve after 4 seconds and valve is closed after 5 seconds from 100% SOC is observed. FIG. 8 illustrates a plot of a simulation where the valve is closed 8 seconds after 100% SOC is observed. The data based on which the simulations are made is found in table 3 and 4 below.

It is noted that even if the valve is closed 8 seconds after 100% SOC is reached (also referred to as observed or established), the final SOC is below 100%. In fact simulations have shown that to arrive at 100% SOC the valve has to be open at least 14 seconds after 100% SOC has been observed in the given simulation setup.

Hence if it is important to close the valve 23 within a time period starting when 100% SOC first is observed, a final SOC at or above 100% cannot be reached unless a period of time has expired. I this this particular simulation 14 seconds has expired.

TABLE 3

Stop at 100% SOC with 4 second valve closing

| | | Recommended values |
|---|---|---|
| Variables - Closing valve | | |
| Vehicle Tank Volume | 144 liter | Current vehicles (122 L-144 L) |
| Vehicle Tank Rating | 700 bar | Current ratings (350 bar and 700 bar) |
| Valve closing time | 4 seconds | Requirement: 0-10 seconds |
| Target SOC | 100 % | |
| Initial flow at stop | 30 g/s | Observed 0 g/s-30 g/s |
| Variables - Creep | | |

TABLE 3-continued

Stop at 100% SOC with 4 second valve closing

| | Recommended values | |
|---|---|---|
| Pressure drop @ stop | 6 bar | AUTO: Depending on valve closing |
| Pressure creep | 20 bar | Observed 0 bar-20 bar |
| Temperature creep | 10 °C. | Observed 0° C.-10° C. |

TABLE 4

Stop at 100% SOC with 8 second valve closing

| | Recommended values | |
|---|---|---|
| Variables - Closing valve | | |
| Vehicle Tank Volume | 144 liter | Current vehicles (122 L-144 L) |
| Vehicle Tank Rating | 700 bar | Current ratings (350 bar and 700 bar) |
| Valve closing time | 8 seconds | Requirement: 0-10 seconds |
| Target SOC | 100 % | |
| Initial flow at stop | 30 g/s | Observed 0 g/s-30 g/s |
| Variables - Creep | | |
| Pressure drop @ stop | 2 bar | AUTO: Depending on valve closing |
| Pressure creep | 20 bar | Observed 0 bar-20 bar |
| Temperature creep | 10 °C. | Observed 0° C.-10° C. |

As noted the drop in final SOC over the settling time ST is just above 4% at least under the conditions set forth in tables 1-4. Based on this knowledge the stop criterion which is most important can be chosen. The main determining factors for terminating a refueling is the total time of a refueling and the final density i.e. final SOC in the vehicle tank.

If the first factor is important, the valve 23 should be allowed to be open for a given time satisfying the overall time considerations of the refueling. If time is of importance the valve 23 is suggested to be terminated within a period of 1 to 15 seconds from 100% SOC is observed, preferably within 3 to 10 seconds, most preferably within 5 seconds.

If the latter factor is important, the valve 23 may be allowed to be open until about 4% over the desired final SOC. Preferably the valve is closed before an upper state of charge USOC reaches an interval of 120 to 125% (final SOC 116%-121%), more preferably before the upper state of charge USOC reaches an interval of 110% to 120% (final SOC 106%-116%) and most preferably the valve is closed when the upper state of charge USOC is within the interval of 100% to 110% (final SOC 96%-106%).

Based on the above calculations and simulations it is now clear that the estimated state of charge SOC may be calculated theoretically and/or established based on empiric measurements obtained during test refueling and where the state of charge will drop to a final SOC after a settling time has elapsed subsequent to termination of refueling. This drop-in state of charge is referred to as correction state of charge CSOC, and the correction state of charge can thus be calculated or estimated prior to the start of the refueling.

Accordingly, prior to termination of the refueling, based on pre-established information, information received from the vehicle or a combination hereof an upper state of charge can be determined. Stopping the refueling at this upper state of charge ensures that the final SOC ends at a desired level while allowing an extremely short refueling process. How much higher than the desired final SOC this upper state of charge has to be, can be determined by simulations or calculations as described above. The refueling process according to an advantageous embodiment of the present invention may thus from a user perspective be much shorter as the user are not required to await corrected estimation of state of charge based on settling measured values of pressure and temperature in the vehicle tank.

In other words, if it is desired to terminate a refueling as fast as possible with as high final SOC as possible, the upper state of charge at which the refueling is terminated, may be determined by estimating or calculating the correction state of charge. Adding this correction state of charge to the desired final SOC results in an upper state of charge at which the estimated state of charge SOC, calculated based on measurements made during the refueling, should be when terminating the refueling.

Hence, the final SOC may e.g. be determined based on a desired percentage or e.g. based on time from when 100% SOC is observed to valve is closed. The latter method may give priority to refueling time and thereby resulting in a final state of charge which is "as high as possible" although the first method may of course also result in an extremely fast refueling process.

In both situations, the upper state of charge is determined as correction state of charge plus final SOC.

Hence, in an embodiment of the invention, if a final SOC of 105% is desired the upper state of charge can be determined as:

$$USOC = SOC\text{final} + CSOC \rightarrow 105 + X \quad \text{[EQ10]}$$

Where: X can be derived from mathematical manipulation of EQ7, EQ8 and EQ9.

In the same way, in an embodiment of the invention, if the refueling is desired terminated within e.g. 5 seconds from 100% SOC is observed, the upper state of charge can be determined as:

$$\text{upper state of charge} = \frac{\rho(P\text{stop}, T\text{stop})}{\rho 0} \quad \text{[EQ11]}$$

$$P\text{final} = P\text{stop} - P\text{creep} * \frac{t}{t\text{set}} \quad \text{[EQ12]}$$

$$T\text{fianl} = T\text{final} + T\text{creep} * \frac{t}{t\text{set}} \quad \text{[EQ13]}$$

Where: t is the 5 seconds
Tset is the determined settling time e.g. 30 seconds
ρ0 [rho0] reference density of full tank what is also referred to as tank rated density (TRD), The final SOC can then be found using (Pfinal, Tfinal) in EQ11 instead of (Pstop, Tstop).

From the above description, it is now clear that the present invention relates to a method of refueling a vehicle tank with a gas, preferably hydrogen fuel. The method is advantageous in that the final SOC of the vehicle tank, when the vehicle is leaving the refueling station, can be determined prior to termination of the refueling. This ensures an optimized refueling either with respect to time or SOC.

A refueling according to the present invention is preferably made by calculating a correction state of charge CSOC which is added to a desired final SOC to obtain an upper state of charge USOC at which the refueling has to terminate to compensate for the fall in SOC occurring from terminating the refueling to a settling time has elapsed.

The correction state of charge CSOC can be determined as described above based on a fixed time (e.g. from 100% SOC is reached) in which gas can continue to be transfer from station to vehicle before terminating the flow. Alternative, correction state of charge CSOC can be determined as described above based on a fixed percentage above 100% SOC until when reached gas can continue to be transferred from station to vehicle before terminating the flow.

The figures are only meant to illustrate embodiments of the invention hence the implementation and design of the HRS and vehicle may vary and still be within the scope of the claims below.

The present invention facilitates a one-ramp refueling process, where the complete refueling is terminated, including final closing of the valve, on the basis of estimations based on rising measures of temperature and pressure in the vehicle tank. The one-ramp should be understood as opposite to other refueling ramps which after reaching a stop value decreases and then after a period of time has elapsed starts to increase again.

For clarification of what is meant by rising measures within the scope of the invention, reference is made to the already mentioned FIG. 4A and FIG. 4B. FIG. 4A is understood as rising measures of the refueling in the sense that estimated state of charge increases due to the refueling, whereas FIG. 4B refers to decreasing estimates of state of charge based on pressure and temperature measured in the vehicle tank subsequent to closing of the valve. According to the present invention, it is possible to terminate or complete the refueling without awaiting an estimate of the final state of charge.

When referring to pressure or temperature inside the vehicle tank a reference is made to values based on which these pressure or temperatures can be established not only direct measurements made inside the vehicle tank. Hence, the pressure and temperature can also be established by measurements made outside the vehicle tank 2, in this case a correction factor may be needed to use measurements from outside the vehicle tank to represent measurements made inside the tank 2.

The invention claimed is:

1. A method of refueling of a tank of a vehicle with a hydrogen gas from a hydrogen refueling station, wherein the refueling includes:
   connecting a hydrogen source with the vehicle tank by means of a hose, the flow of hydrogen gas in the hose being controlled by a controller controlling a valve,
   initiating the refueling by determining the pressure of the vehicle tank,
   opening the valve and monitoring a temperature and a pressure of the hydrogen gas in the vehicle tank,
   based on the monitored temperature and the monitored pressure establishing an estimated state of charge during the refueling,
   a state of charge of 100% related to the vehicle tank being a tank rated density,
   terminating the refueling of the vehicle tank by closing the valve when the estimated state of charge reaches an upper state of charge, the upper state of charge being above the tank rated density, the upper state of charge being determined on the basis of a pre-estimated correction of state of charge, the pre-estimated correction of state of charge designating a decrease of the estimated state of charge in the vehicle tank after the closing of the valve,
   disconnecting the hose between the vehicle tank and the hydrogen source before the vehicle tank has reached a final state of charge, the final state of charge being the state of charge in the vehicle tank after a settling time,
   wherein the pre-estimated correction of state of charge estimates the difference between a true state of charge and the estimated state of charge established based on the monitored temperature and the monitored pressure such that said terminating the refueling at the upper state of charge results in the final state of charge being below the tank rated density.

2. The method of refueling of a tank of a vehicle according to claim 1, wherein the decrease of the estimated state of charge in the vehicle tank after the closing of the valve takes place at least partly after the closing of the valve and after the hose has been disconnected.

3. The method of refueling a tank of a vehicle according to claim 1, wherein tank data related to the tank of the vehicle is communicated from the vehicle comprising the tank through a data communication line between the vehicle and the hydrogen refueling station.

4. The method of refueling a tank of a vehicle according to claim 1, wherein tank data related to the tank of the vehicle is communicated from the vehicle comprising the tank through an initial automatic data communication communicating vehicle tank type identification data between the vehicle and the hydrogen refueling station and wherein the upper state of charge is determined on the basis of vehicle tank type identification data.

5. The method of refueling a tank of a vehicle according to claim 1, wherein the pre-estimated correction of state of charge when subtracted from the upper state of charge will estimate a state of charge approximating the tank rated density after the valve has been closed.

6. The method of refueling a tank of a vehicle according to claim 1, wherein the pre-estimated correction of state of charge when subtracted from the upper state of charge will estimate a state of charge of the tank which is within +/−2% of the tank rated density.

7. The method of refueling a tank of a vehicle according to claim 1, wherein the pre-estimated correction of state of charge when subtracted from the upper state of charge will estimate a state of charge of the tank which result in a stabilization of the vehicle tank after closing of the valve which is 0.1 to 5% below the tank rated density.

8. The method of refueling a tank of a vehicle according to claim 1, wherein the time between the closing of the valve and the time at which the estimated state of charge has reached the final state of charge is the settling time and wherein the settling time is between 5-120 seconds.

9. The method of refueling a tank of a vehicle according to claim 1, wherein the disconnecting of the hose between the vehicle tank and the hydrogen source is initiated while the estimated state of charge is greater than the tank rated density.

10. The method of refueling a tank of a vehicle according to claim 1, wherein the upper state of charge is calculated and pre-stored in memory associated with the controller.

11. The method of refueling a tank of a vehicle according to claim 1, wherein the monitored temperature and the monitored pressure is obtained through measuring by means of sensors thereby obtaining temperature representative data and pressure representative data, the temperature representative data and pressure representative data being communicated to the controller by means of a data connection between the vehicle and the hydrogen refueling station during the refueling process.

12. The method of refueling a tank of a vehicle according claim 11, wherein the communication of the temperature representative data and pressure representative data to the controller by means of the data connection between the vehicle and the hydrogen refueling station during the refueling process is terminated when the hose is disconnected at the end of the fueling process.

13. The method of refueling a tank of a vehicle according to claim 1, wherein pressure of hydrogen flowing in the hose is measured at the hydrogen refueling station and converted into hydrogen refueling station pressure representative data.

14. The method of refueling a tank of a vehicle according to claim 1, wherein the refueling process upon an undesired termination of the data connection between the vehicle and the hydrogen refueling station is continued with a stop criterion for the refueling now being a predefined hydrogen refueling station pressure instead of the upper state of charge.

15. The method of refueling a tank of a vehicle according to claim 1, wherein the valve is closed within 5 seconds from when the estimated state of charge has reached the tank rated density.

16. The method of refueling a tank of a vehicle according to claim 1, wherein the valve is at least partly open for a period of time from when the estimated state of charge has reached the tank rated density.

* * * * *